(12) United States Patent
Tuten et al.

(10) Patent No.: US 9,419,518 B2
(45) Date of Patent: Aug. 16, 2016

(54) TRANSFER FUNCTION GENERATION BASED ON PULSE-WIDTH MODULATION INFORMATION

(71) Applicant: QUALCOMM Incorporated, San Diego, CA (US)

(72) Inventors: Charles Derrick Tuten, Scottsdale, AZ (US); Joseph Duncan, San Francisco, CA (US); Marko H Koski, Chandler, AZ (US)

(73) Assignee: QUALCOMM INCORPORATED, San Diego, CA (US)

( * ) Notice: Subject to any disclaimer, the term of this patent is extended or adjusted under 35 U.S.C. 154(b) by 90 days.

(21) Appl. No.: 13/787,334

(22) Filed: Mar. 6, 2013

(65) Prior Publication Data
US 2014/0253074 A1   Sep. 11, 2014

(51) Int. Cl.
*H02M 3/156* (2006.01)

(52) U.S. Cl.
CPC ..................................... *H02M 3/156* (2013.01)

(58) Field of Classification Search
CPC ..... H02M 3/155; H02M 3/156; H02M 3/158; H02M 3/1563; H02M 3/1588
USPC .................. 323/282, 284–288; 363/74, 78–80
See application file for complete search history.

(56) References Cited

U.S. PATENT DOCUMENTS

| | | | |
|---|---|---|---|
| 6,465,993 B1 | 10/2002 | Clarkin et al. | |
| 6,534,962 B1 * | 3/2003 | Lee | 323/290 |
| 6,583,609 B1 * | 6/2003 | Pardoen | 323/283 |
| 7,595,624 B2 | 9/2009 | Tateishi et al. | |
| 8,040,122 B2 | 10/2011 | Chang et al. | |
| 8,154,264 B2 | 4/2012 | Kenly et al. | |
| 8,188,721 B2 * | 5/2012 | Isham et al. | 323/282 |
| 8,575,910 B2 * | 11/2013 | Young | 323/282 |
| 2004/0196012 A1 * | 10/2004 | Luu | 323/282 |
| 2010/0127682 A1 | 5/2010 | Kenly et al. | |
| 2011/0031948 A1 | 2/2011 | Chien et al. | |
| 2011/0127980 A1 | 6/2011 | Chen et al. | |
| 2011/0291626 A1 | 12/2011 | Murakami | |
| 2012/0153919 A1 | 6/2012 | Garbossa et al. | |

(Continued)

FOREIGN PATENT DOCUMENTS

WO    2010011946 A1    1/2010

OTHER PUBLICATIONS

IEEE 100 The Authoritative Dictionary of IEEE Standards Terms Seventh Edition, IEEE Std 100-2000 , pp. 435, 2000.*

(Continued)

*Primary Examiner* — Gary L Laxton
*Assistant Examiner* — Kevin H Sprenger
(74) *Attorney, Agent, or Firm* — Arent Fox LLP

(57) ABSTRACT

Exemplary embodiments are related to generating an error correction voltage and/or a compensation voltage based upon pulse-width modulation information. A device may include a pulse-width modulator configured to receive a first input voltage and convey a modulated output voltage. The device may also include a filtering unit including at least one filter configured to receive the modulated output voltage, generate at least one of an error correction voltage and a compensation voltage, and convey a second input voltage to the pulse-width modulator based on at least one of the error correction voltage and a compensation voltage.

10 Claims, 12 Drawing Sheets

(56) References Cited

U.S. PATENT DOCUMENTS

| | | |
|---|---|---|
| 2012/0181950 A1 | 7/2012 | Yu et al. |
| 2012/0194152 A1 | 8/2012 | Martinelli |
| 2012/0217940 A1 | 8/2012 | Kiadeh et al. |
| 2013/0038308 A1 | 2/2013 | Sumitomo |
| 2014/0253075 A1 | 9/2014 | Tuten |

OTHER PUBLICATIONS

"Hagen R., et al., "Applying digital technology to PWM control-loop designs," http://www.ti.com/download/trng/docs/seminar/Topic_7_Hagen, Section II, Part B, pp. 7-5."

International Search Report and Written Opinion—PCT/US2014/018789—ISA/EPO—Feb. 18, 2015.

\* cited by examiner

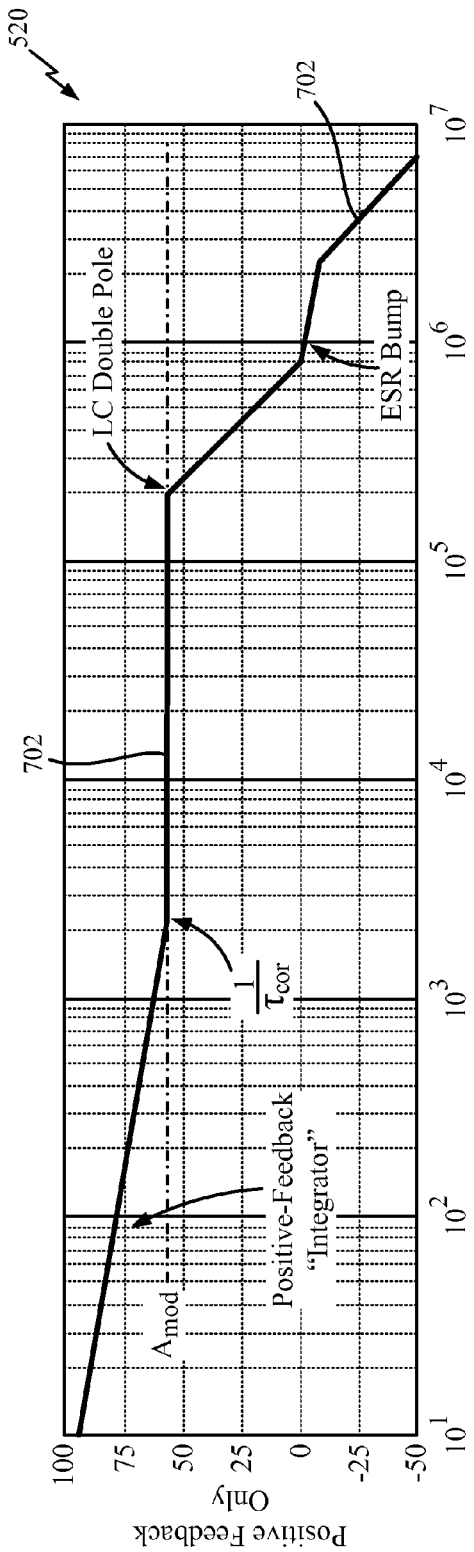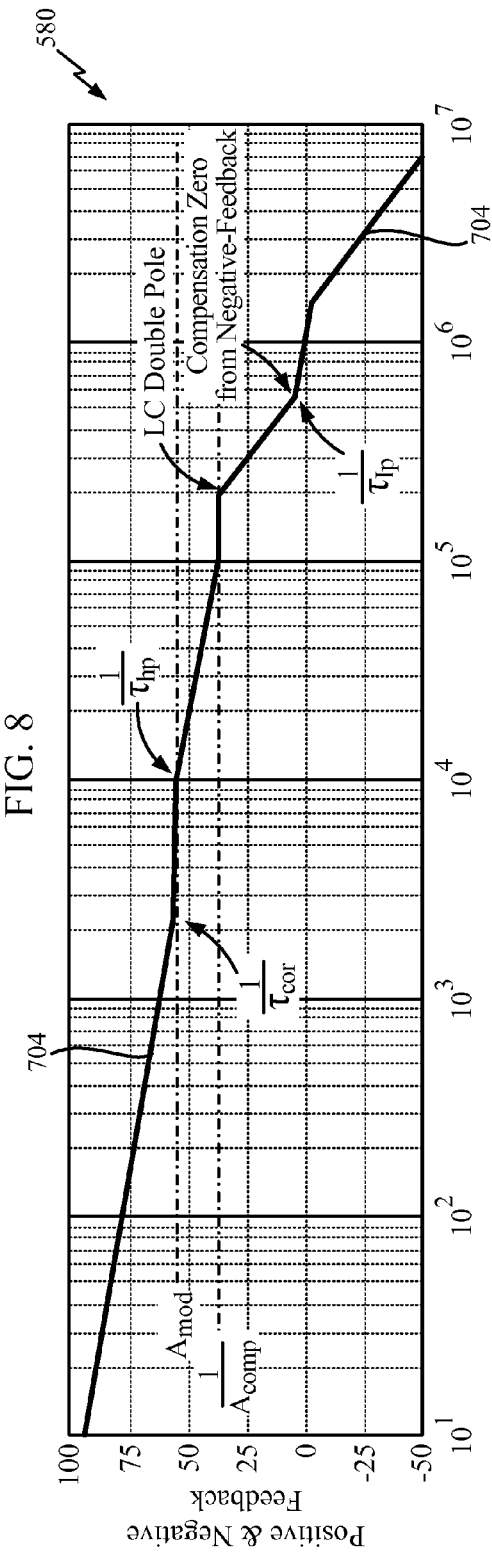
FIG. 8
FIG. 10

TRANSFER FUNCTION GENERATION BASED ON PULSE-WIDTH MODULATION INFORMATION

REFERENCE TO CO-PENDING APPLICATIONS FOR PATENT

The present Application for Patent is related to the following co-pending U.S. Patent Application:

"SWITCHING POWER CONVERTER", having Ser. No. 13/787,360 filed concurrently herewith, assigned to the assignee hereof, and expressly incorporated by reference herein.

BACKGROUND

1. Field

The present invention relates generally to generating transfer functions based on pulse-width modulation information. More specifically, the present invention relates to embodiments for generating error correction and/or compensations voltages based on pulse-width modulation information.

2. Background

An electronic device, such as a mobile telephone, may include a power converter (i.e., a voltage regulator) that receives an input voltage from a power supply and generates an output voltage for a load. An integrated circuit may include a power converter for providing a stable voltage reference for on-chip components such as a digital component, an analog component, and/or a radio-frequency (RF) component.

A power converter may comprise a switching power converter, which rapidly switches a power transistor between saturation (i.e., completely on) and cutoff (i.e., completely off) with a variable duty cycle. A resulting rectangular waveform is low pass filtered in order to produce a nearly constant output voltage proportional to the average value of the duty cycle. One advantage of a switching power converter compared to a linear power converter is greater efficiency because the switching transistor dissipates little power as heat in either a saturated state or a cutoff state.

As understood by a person having ordinary skill in the art, a switching power converter may include a feedback path coupled to an output and configured for generating error correction and compensation voltages. However, as described more fully below, a feedback may include various components that may induce latency, delay, and/or attenuation.

A need exists for generating one or more transfer functions based on pulse-width modulation information. More specifically, a need exists for embodiments related to generating an error correction voltage, a compensation voltage, or both, based on pulse-width modulation information.

BRIEF DESCRIPTION OF THE DRAWINGS

FIG. 8 depicts a bode plot for a transfer function of an error correction model.

FIG. 10 depicts a bode plot for a transfer function of an error correction and compensation model.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

Figure 1:
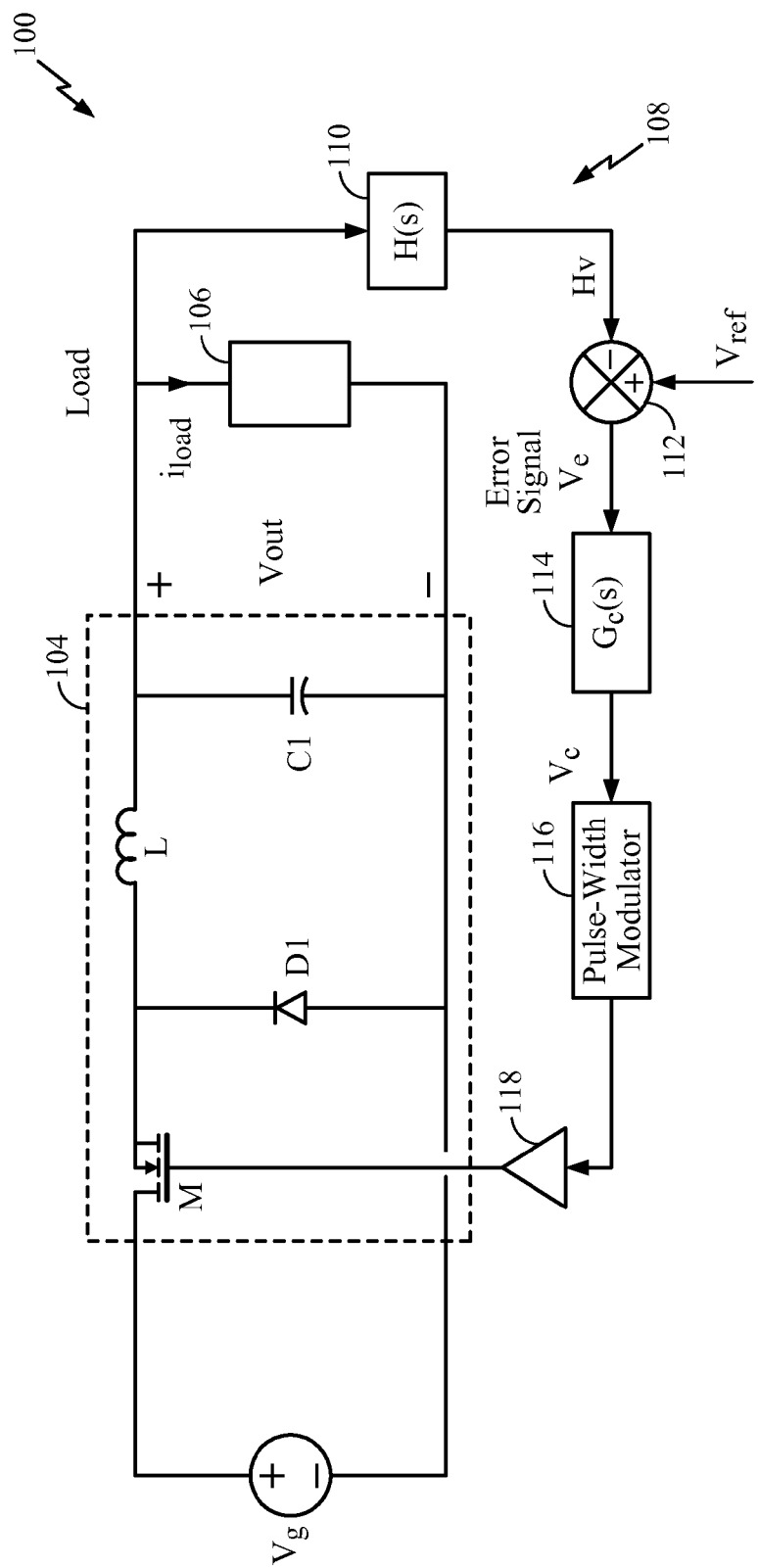
FIG. 1 illustrates a power converter including a feedback path having a sensor gain, an operational amplifier, and a compensator.

FIG. 1 illustrates a switching power converter 100 configured for receiving an input voltage Vg and conveying an output voltage Vout. Power converter 100 includes a switching unit 104, a load 106, and a feedback path 108. Switching unit 104 includes a transistor M, a diode D1, an inductor L, and a capacitor C1. Further, feedback path 108 includes a sensor gain 110, an error amplifier 112, a compensator 114, a pulse-width modulator 116, and a gate driver 118. As will be understood by a person having ordinary skill, sensor gain 110 is configured to receive output voltage Vout and convey a feedback signal Hv to error amplifier 112. Error amplifier 112 is configured to receive feedback signal Hv and a reference signal $V_{ref}$, and output an error signal $V_e$ to compensator 114, which conveys a correction signal $V_c$ to pulse-width modulator 116. Pulse-width modulator 116 is configured to convey a signal to gate driver 118, which, upon receipt of the signal from pulse-width modulator 116, may convey a signal to transistor M1.

Exemplary embodiments, as described herein, are directed to devices, systems, and methods for generating an error correction signal and/or a compensation signal based on pulse-width modulation information. According to one exemplary embodiment, a device may include a pulse-width modulator configured to receive a first input voltage and convey a modulated output voltage. The device may also include a filtering unit having at least one filter configured to receive the modulated output voltage, generate an error correction voltage and/or a compensation voltage, and convey a second input voltage to the pulse-width modulator based on at least one of the error correction voltage and a compensation voltage.

According to another exemplary embodiment, the present invention includes methods for operating a switching power converter. Various embodiments of such a method may include generating a pulse-width modulator (PWM) signal with a PWM and filtering the PWM signal to generate at least one of an error correction voltage and a compensation voltage. Further, the method may include modifying a reference voltage received at the PWM based on at least one of the error correction voltage and the compensation voltage.

Other aspects, as well as features and advantages of various aspects, of the present invention will become apparent to those of skill in the art though consideration of the ensuing description, the accompanying drawings and the appended claims.

Figure 2:
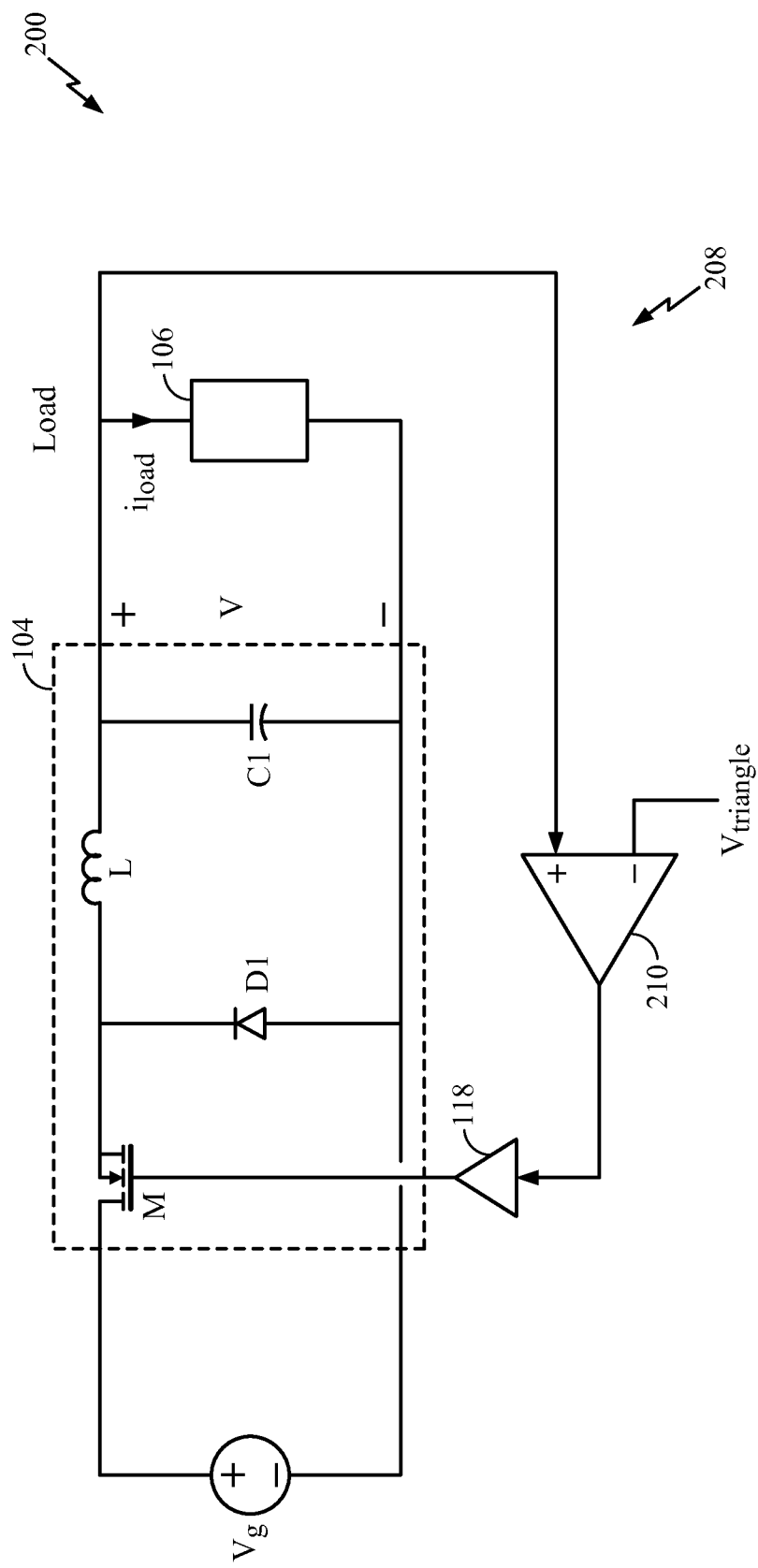
FIG. 2 illustrates a switching power converter including a switching unit configured for coupling an output voltage to an input of an amplifier, according to an exemplary embodiment of the present invention.
Figure 3:
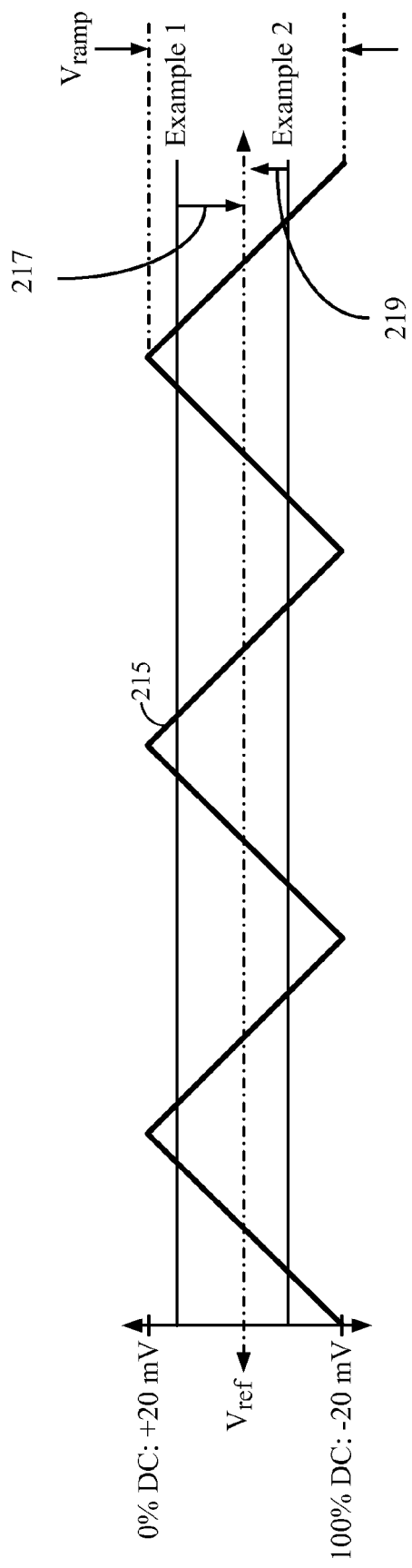
FIG. 3 depicts a triangle wave, which may be conveyed to a pulse-width modulator of a power converter.

FIG. 2 depicts a power converter 200, according to an exemplary embodiment of the present invention. Power converter 200, which is configured to receive input voltage Vg and convey an output voltage V, includes switching converter unit 104, load 106, and a feedback path 208. Switching unit 204 includes transistor M, diode D1, inductor L, and capacitor C1. Further, feedback path 208 includes comparator 210, which, as described below, may comprise a pulse-width modulator. Comparator 210 includes one input configured to receive output voltage V of power converter 200 and another input configured to receive a triangle waveform ($V_{triangle}$) 215, as illustrated in FIG. 3. More specifically, as an example, a non-inverting input of comparator 210 may be configured to receive output voltage V and an inverting input of comparator 210 may be configured to receive triangle waveform 215. Feedback path 208 further includes gate driver 118 configured to receive an output of comparator 210. Gate driver 118 is further configured to convey a signal to a gate of transistor M1.

It is noted that triangle waveform 215, as shown in FIG. 3, may be centered at a desired output voltage (i.e., a reference voltage $V_{ref}$). Centering triangle waveform 215 at a desired output voltage may allow for seamless non-linear operation to occur. In addition, 0% and 100% duty cycles may occur naturally, above and below triangle waveform 215. Using a small magnitude triangle waveform may provide for very high gain, which may allow power converter 200 to operate with high performance. For example the magnitude $V_M$ of triangle waveform 215 may comprise 40 millivolts (mV).

Coupling output voltage V directly to amplifier 210 allows for a fast transient response. Stated another way, feedback path 208, which lacks any elements that may induce latency, delay, and/or attenuation, directly couples output voltage V to amplifier 210 and, thus, provides amplifier 210 with maximum visibility of output voltage V. Therefore, amplifier 210 may quickly detect and respond to any changes in output voltage V. Stated yet another way, the direct connection between output voltage V and amplifier 210 may allow amplifier 410 to respond instantly and optimally to changes in output voltage V caused by varying load conditions.

Figure 4:
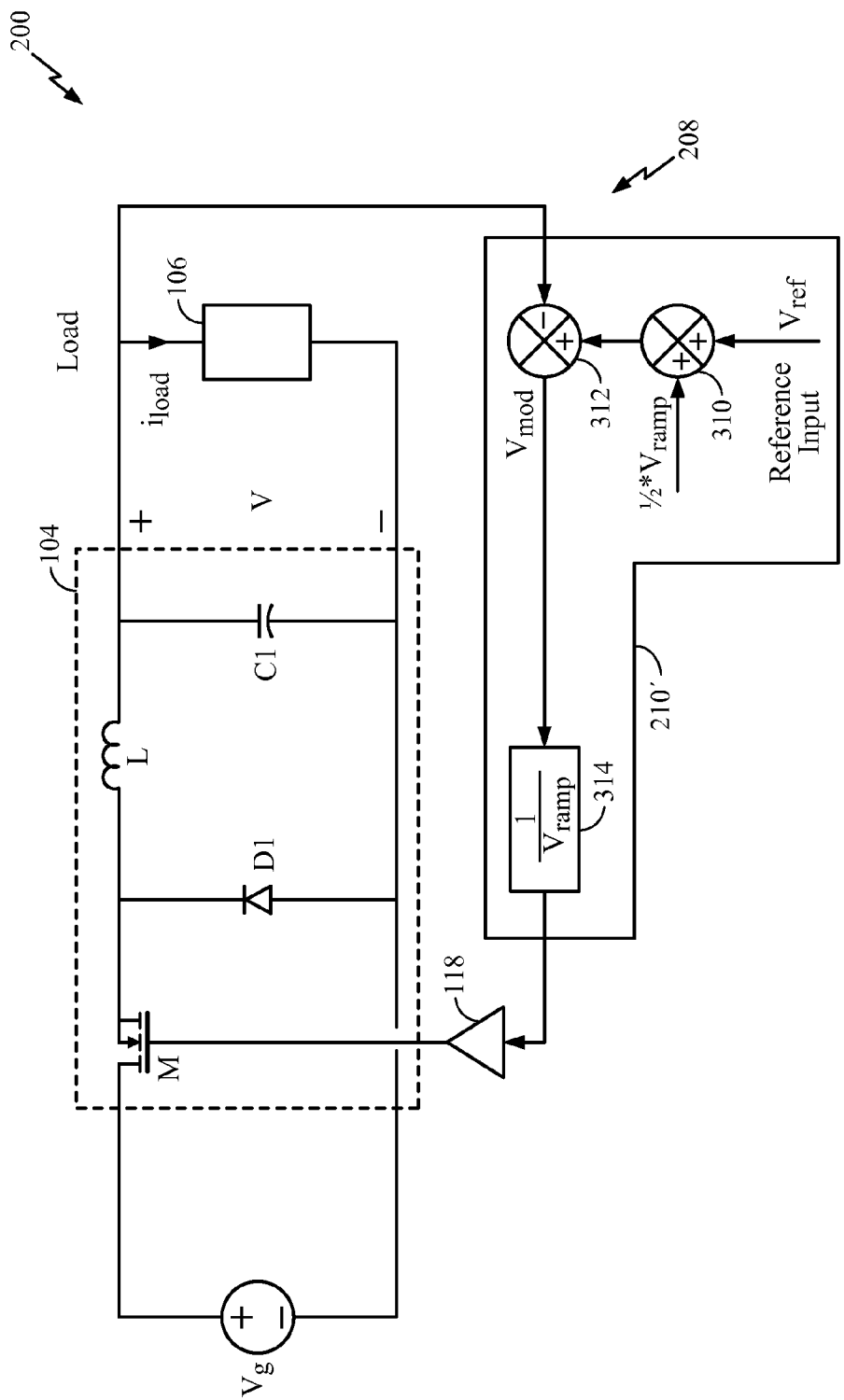
FIG. 4 illustrates a switching power converter including a switching unit configured for coupling an output voltage to an input of a pulse-width modulator, according to an exemplary embodiment of the present invention.

FIG. 4 illustrates another illustration of power converter 300 wherein comparator 210 of FIG. 2 is depicted as a pulse-width modulator 210' coupled between an output of switching unit 104 and an input of gate driver 118. According to an exemplary embodiment, pulse-width modulator 210' includes a summer 310 configured to receive a first signal, which is depicted as a reference input $V_{ref}$ (i.e., a desired output voltage), and a second signal, which may comprise a ramp voltage, or a fraction thereof (e.g., $\frac{1}{2}*V_{ramp}$). It is noted that ramp voltage $V_{ramp}$ may comprise a DC voltage corresponding to a height of triangle waveform 215. Summer 310 is configured to convey a scaled reference voltage. Pulse-width modulator 210' further includes a comparator 312 configured to receive output voltage V and the scaled reference voltage conveyed by summer 310. Comparator 312 is further configured to convey a modulated signal $V_{mod}$ to a divider 314, which may divide modulated signal $V_{mod}$ by ramp voltage $V_{ramp}$ to generate a duty cycle. Divider 314 may further be configured to convey a signal to gate driver 118, which is configured to convey a signal to a gate of transistor M1. As an example, if reference voltage $V_{ref}$=1 volt, ramp voltage $V_{ramp}$=0.040 volt, and output voltage V (i.e. Hv)=1 volt, then modulated voltage $V_{mod}$=1−1+0.020=0.020 volt, and duty cycle δ=0.020/0.040, which provides for a 50% duty cycle.

As noted above, and, as illustrated in FIG. 4, an output of switching unit 104 is directly coupled to an input of pulse-width modulator 210' and, therefore, feedback path 208 allows for a fast transient response. Stated another way, feedback path 208, which lacks any element that may induce latency, delay, and/or attenuation, directly couples output voltage V to pulse-width modulator 210'. Accordingly, pulse-width modulator 210' is provided with maximum visibility of output voltage V, and, as a result, may quickly detect, and respond to any changes in output voltage V. Stated yet another way, the direct connection between output voltage V and pulse-width modulator 210' may allow pulse-width modulator 210' to respond instantly and optimally to output voltage changes caused by varying load conditions.

Figure 5:
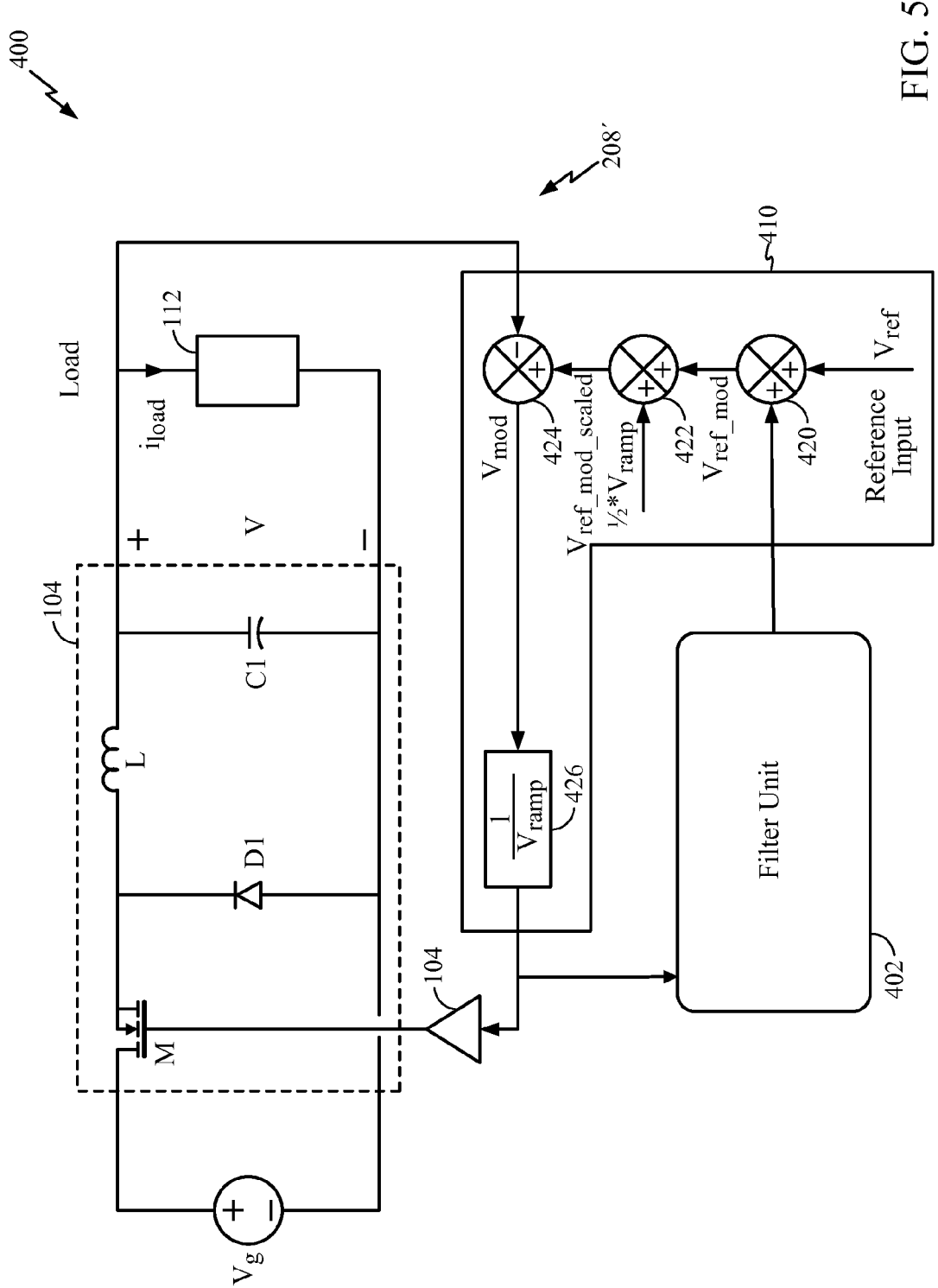
FIG. 5 illustrates another switching power converter including a feedback path directly coupling an output voltage to a pulse-width modulator, and a filter unit, in accordance with an exemplary embodiment of the present invention.

Although configuring pulse-width modulator 210' to directly receive output voltage V via feedback path 208 allows for a fast transient response, the signal provided via feedback path 208 is uncorrected (i.e., output voltage V is in error to the desired voltage) and uncompensated (i.e., may not be stable under all circumstances). FIG. 5 illustrates another switching power converter 400 including a feedback path 208' and a filter unit 402, according to an exemplary embodiment of the present invention. Power converter 400, which is configured to receive input voltage Vg and convey output voltage V, includes switching unit 104 and load 106. Switching unit 104 includes transistor M, diode D1, inductor L, and capacitor C1. Further, power converter 400 includes a pulse-width modulator 410 coupled between an output of switching unit 104 and an input of gate driver 118.

According to an exemplary embodiment, pulse-width modulator 410 includes an summer 420 configured to receive a first signal depicted as reference input $V_{ref}$ (i.e., a desired output voltage) and a second signal conveyed from filtering unit 402. Pulse-width modulator 410 further includes summer 422 configured to receive a modified reference voltage $V_{ref\_mod}$, which is output from summer 420, and another signal, which may comprise ramp voltage or a fraction thereof (i.e. $\frac{1}{2}*V_{ramp}$). Pulse-width modulator 410 further includes a comparator 424 configured to receive an output of switching unit 104 (i.e., output voltage V) and an output of summer 422, which may comprise a scaled, modified reference voltage $V_{ref\_mod\_scaled}$. Comparator 424 is further configured to convey a modulated signal $V_{mod}$ to a divider 426, which may divide modulated signal $V_{mod}$ by ramp voltage $V_{ramp}$, which comprises a gain of pulse-width modulator 410, to generate the duty cycle. Divider 426 may also be configured to convey a signal to gate driver 118, which is configured to convey a signal to a gate of transistor M1. As illustrated in FIG. 5, an output of switching unit 104 is directly coupled to at least one input of pulse-width modulator 410 via feedback path 208', which lacks any elements that may induce latency, delay, and/or attenuation.

In addition, filter unit 402 is coupled between an output of pulse-width modulator 410 and an input of pulse-width modulator 410. Filter unit 402, which may comprise one or more independently tunable filters, may be configured to generate one or more transfer functions in the frequency domain for lead, lag, delay, integration, and/or differentiation based on PWM (i.e., duty cycle) information received via the output of pulse-width modulator 410. According to an exemplary embodiment of the present invention, filter unit 402 is configured to receive an output of pulse-width modulator 410 and, in response thereto, generate an error correction signal, a compensation voltage, or both, and convey a signal based on the error correction signal, the compensation signal, or both, to summer 420 of pulse-width modulator 410. The signal received by summer 420 via filter unit 402 may be used to modify reference voltage $V_{ref}$ within pulse-width modulator 410.

Figure 6:
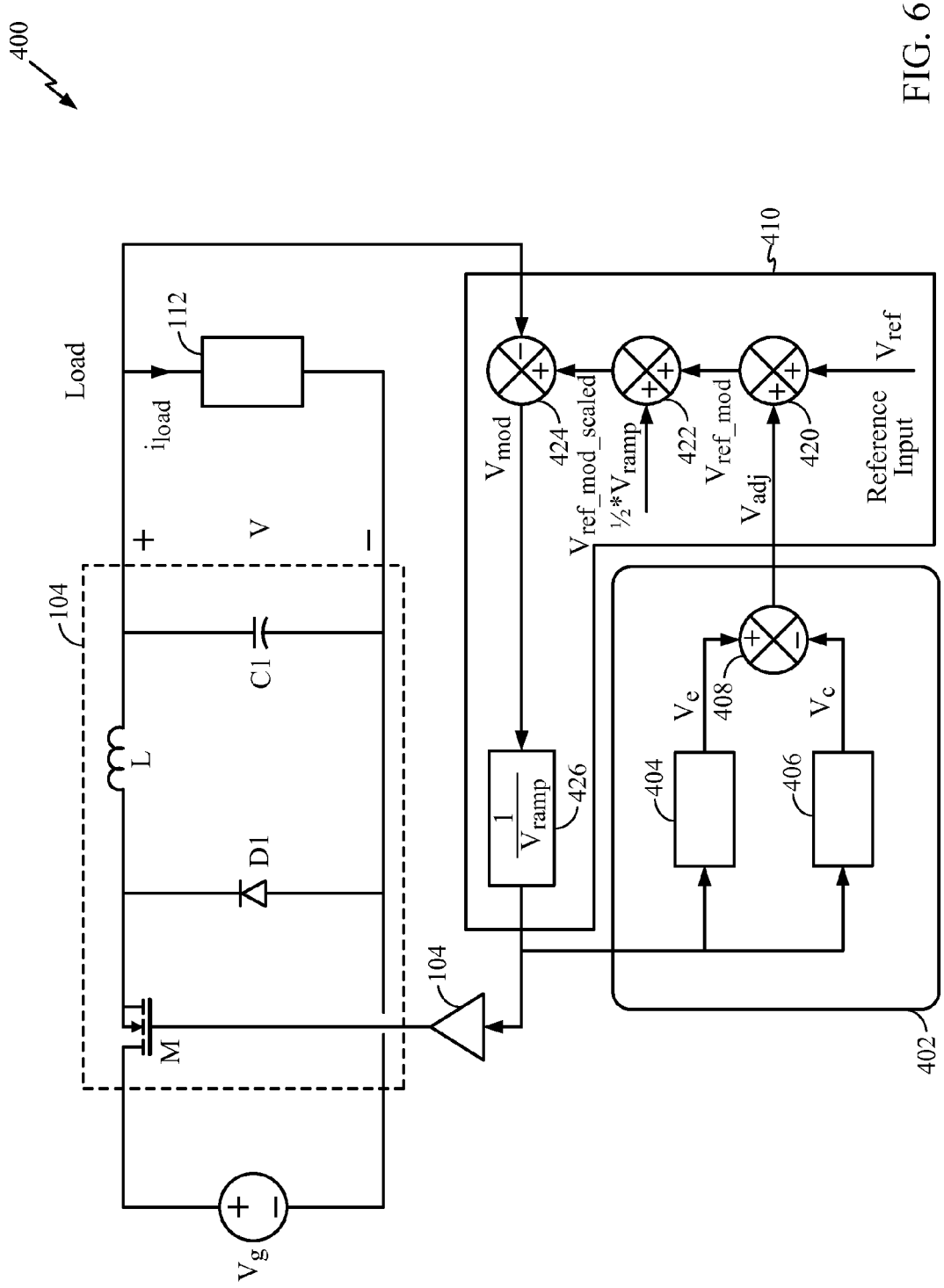
FIG. 6 illustrates a switching power converter including a feedback path directly coupling an output voltage to a pulse-width modulator, and a filter unit including a filter for generating an error correction signal and another filter for generating a compensation signal, in accordance with an exemplary embodiment of the present invention.

According to one exemplary embodiment, which is illustrated in FIG. 6, filter unit 402 includes a filter 404, a filter 406, and a comparator 408. Each of filter 404 and filter 406 may be configured to receive a signal output from pulse-width modulator 410. Further, upon receipt of the signal from pulse-width modulator 410, filter 404 may generate an error signal $V_e$ (also referred to herein as an "error correction voltage $V_e$"), which may be conveyed to comparator 408. Moreover, upon receipt of the signal from pulse-width modulator 410, filter 406 may generate a compensation signal $V_c$ (also referred to herein as a "compensation voltage $V_c$"), which may also be conveyed to comparator 408.

As a more specific example, filter 404 may comprise a low-pass filter for generating error correction voltage $V_e$ (i.e., lag). By applying a low-pass filter to the output of pulse-width modulator 410, a positive feedback correction voltage (i.e., error correction voltage $V_e$) can be generated to possibly reduce the output error, to near zero, without a traditional error amplifier. Further, as another example, filter 406 may comprise a bandpass filter for generating compensation voltage $V_c$ (i.e., lead-lag). By applying a bandpass filter to the output of pulse-width modulator 410, a negative feedback compensation voltage (i.e., compensation voltage $V_c$) may be generated to reduce system gain at a desired frequency to provide system stability during fast load changes.

In response to receipt of signals from filter 404 and/or filter 406, comparator 408 may convey an adjustment signal $V_{adj}$ to summer 420 of pulse-width modulator 410. Thus, a reference voltage, which is provided to summer 422 is modified and, as a result, the triangle waveform, which is centered around the reference voltage, is modified in response to changes in output voltage V. It is noted that error correction signal Ve is based upon the duty cycle and provides a slow response to change. Compensation signal Vc provides a signal when the duty cycle is changing at a rapid rate. As will be appreciated, compensation signal Vc produces pulses while error correction signal Ve produces levels.

It is noted that power converter 400 includes a single feedback control loop, which includes two paths, one path (i.e., feedback path 208') provides fast transient response for adjusting output voltage V in response to changes in load conditions, and another path, including filter unit 402, provides error correction and/or compensation.

As will be appreciated by a person having ordinary skill in the art, in comparison to power converter 100 shown in FIG. 1, which includes loop compensation in a single feedback path (i.e., feedback paths 108), the loop compensation of power converter 400 shown in FIG. 6, is inserted into the triangle waveform by centering the triangle waveform at the desired output voltage. Stated another way, instead of providing error correction and/or compensation in a single feedback path, as shown in power converter 100, power converter 400 is configured to provide error correction and/or compensation by modifying a reference voltage and, thus, a triangle waveform received by pulse-width modulator 410. Stated yet another way, by modifying reference voltage $V_{ref}$ with adjustment signal $V_{adj}$, the triangle waveform, which is centered on reference voltage $V_{ref}$, is moved up or down momentarily as necessary. Thus, a gain of pulse-width modulator 410 may be reduced at a compensation frequency. Accordingly, pulse-width modulator 410 may operate both as a modulator and a low gain error amplifier. Since the error amplifier gain is low, some error adjustment may be made, and can be applied by again by moving the triangle waveform up or down. It is noted that for error correction, the triangle waveform is moved down for duty cycles less than 50% and up for duty cycles greater than 50% (opposite or positive feedback). Further, for compensation, the triangle waveform is moved down for negative changes in output voltage V, which causes the duty cycle from pulse-width modulator 610 to be reduced. The triangle waveform is moved up for positive changes in output voltage V (same direction or negative feedback). This movement may only be temporary, as changes in the duty cycle that match certain frequency constraints are being detected. As an example, compensator 114 may comprise a band pass filter.

According to one exemplary embodiment, correction voltage $V_c$ may be defined as follows:

$$V_c=(V_{ramp}/2)-V_{ramp}*(1-\text{duty cycle}) \quad (1)$$

Thus, in one example (i.e., "Example 1" illustrated in FIG. 3) wherein $V_{ramp}$ is equal to 40 mV and a duty cycle is 15%, correction voltage $V_c$ may provide for a −14 mV adjustment as depicted by reference number 217 in FIG. 3. In another example (i.e., "Example 2" illustrated in FIG. 3) wherein $V_{ramp}$ is equal to 40 mV and a duty cycle is 70%, correction voltage $V_c$ may provide for an 8 mV adjustment as depicted by reference number 219 in FIG. 3.

Figure 7:
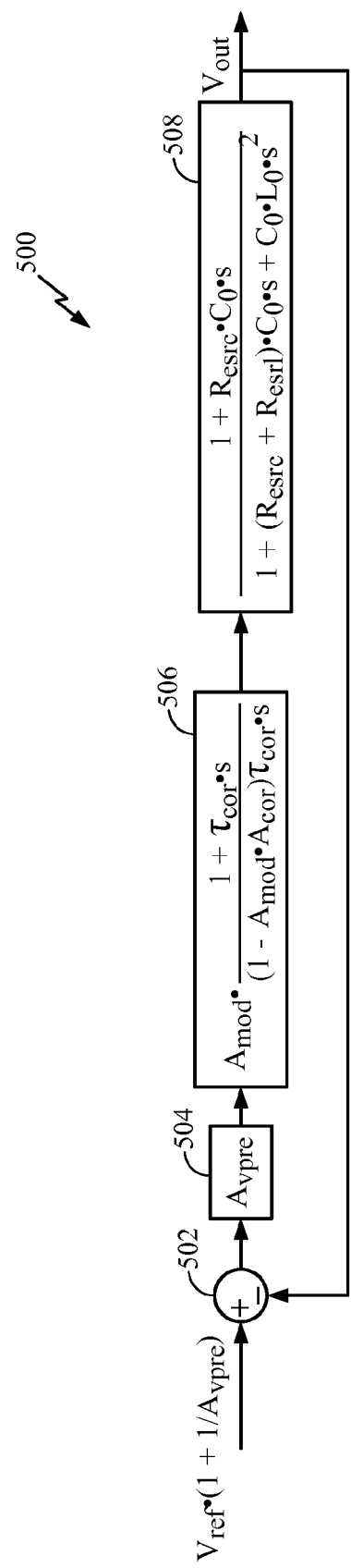
FIG. 7 depicts a transfer function of an error correction model, according to an exemplary embodiment of the present invention.

FIG. 7 depicts an error correction model 500, according to an exemplary embodiment of the present invention. Model 500, which comprises a transfer function of a power converter comprising a filter unit having a filter for generating an error correction voltage, includes a summer 502 and a gain unit 504, which may comprise any gain value (e.g., a gain of 1). Model 500 further includes unit 506 coupled between gain unit 504 and a unit 508. Unit 508 may convey an output $V_{OUT}$, which may be conveyed to a negative input of summer 502. With respect to FIGS. 6 and 7, unit 506 may represent pulse-width modulator 410 and filter unit 402, and unit 508 may represent switching converter 104. Further, it is noted that "$A_{vpre}$" is gain value, "$A_{mod}$" is the gain of pulse-width modulator 610, "$A_{cor}$" is the gain of filter 404, "$\tau_{cor}$" is a frequency of filter 404, "$R_{esrc}$" is a resistance value of capacitor C1, "$R_{esrl}$" is a resistance value of inductor L, "$C_0$" is capacitance value of C1, "$L_0$" is is an inductance value of L. If $A_{cor}=1/A_{mod}=V_{ramp}/V$, the illustrated transfer function includes a pole and, therefore, a very high gain at the origin. It is noted that the modulator square wave (i.e., the output of unit 506) may be scaled equal to the magnitude of $V_{ramp}$ before being RC-filtered for maximal DC gain, and, therefore accuracy.

FIG. 8 depicts a bode plot 520 illustrating a transfer function of a model (e.g., model 500) that is configured for generating a positive feedback correction voltage (e.g., error correction voltage $V_e$).

Figure 9:
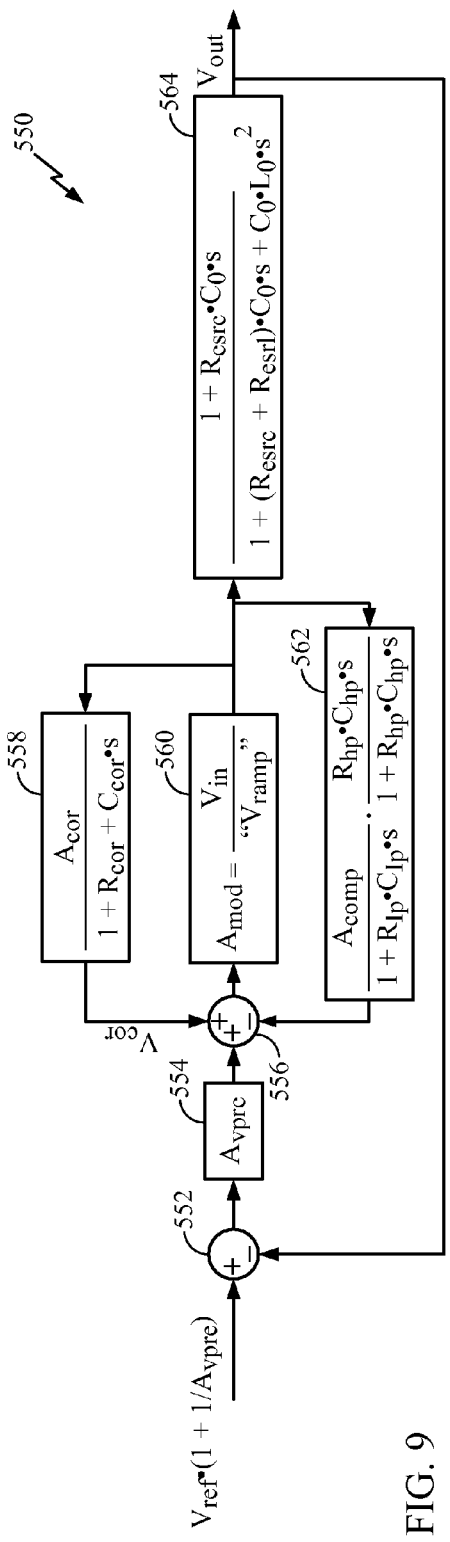
FIG. 9 depicts a transfer function of an error correction and compensation model, in accordance with an exemplary embodiment of the present invention.

FIG. 9 depicts an error correction and compensation model 550, in accordance with an exemplary embodiment of the present invention. Model 550, which comprises a transfer function of a power converter comprising a filter unit having one or more filters for generating an error correction voltage and compensation voltage, includes summer 552 and gain unit 554, which may comprise any gain value (e.g., a gain of 1). Model 550 further includes summer 556 and unit 560 coupled between gain unit 554 and a unit 564. Moreover, model 550 includes unit 558 configured to receive an output of unit 560 and convey a signal to summer 556. In addition, model 550 includes unit 562 configured to receive an output of unit 560 and convey a signal to summer 556. Unit 564 may receive a signal from unit 560 and convey an output $V_{OUT}$, which may be conveyed to a negative input of summer 552. With respect to FIGS. 6 and 9, unit 560 may represent pulse-width modulator 410, unit 558 may represent filter 404, unit 562 may represent filter unit 402, and unit 564 may represent switching converter 104. Further, it is noted that "$A_{comp}$" is the compensation gain, "$R_{lp}$" is a resistance value of a low-pass portion of filter 406, "$C_{lp}$" is a capacitance value of the low-pass portion of filter 406, "$R_{hp}$" is a resistance value of a high-pass portion of filter 406, "$C_{hp}$" is a capacitance value of the high-pass portion of filter 406, "$R_{cor}$" is a resistance value of a filter 404, "$C_{cor}$" is a capacitance value of filter 404, "$V_{ramp}$" is the peak-to-peak voltage of the triangle waveform (i.e., the height of the triangle waveform) and "$V_{in}$" is the input voltage received at comparator 424 (i.e., output voltage Vout conveyed by switching unit 104). It is noted that pulse-width modulator 410 can be modeled as a simple gain block at frequencies significantly below the switching frequency of the power converter. Therefore, lower-frequency feedback may be feed back around to perform compensation, similar to an operational amplifier.

FIG. 10 depicts a bode plot 580 illustrating a transfer function of a model (e.g., model 550) that is configured for generating a positive feedback correction voltage (e.g., compensation voltage $V_e$) and a negative feedback compensation voltage (e.g., compensation voltage $V_c$). It is noted that in comparison to bode plot 520 illustrated in FIG. 8, bode plot 580 includes additional phase margin due to the filter 406.

Figure 11:
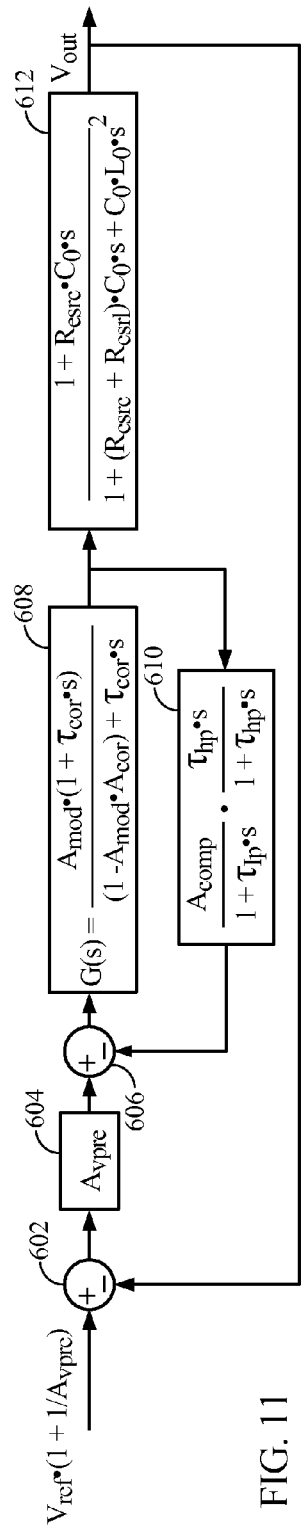
FIG. 11 depicts a transfer function for a collapsed voltage correction model with compensation, in accordance with an exemplary embodiment of the present invention.

FIG. 11 depicts a collapsed error correction model 600 with compensation, according to an exemplary embodiment of the present invention. Model 600 includes summer 602 and a gain unit 604, which may comprise any gain (e.g., a gain of 1). Model 600 further includes summer 606 and unit 608 coupled between gain unit 604 and a unit 612. Moreover, model 600 includes unit 610 configured to receive an output of unit 608 and convey a signal to summer 606. Unit 612 may receive an signal from unit 608 and convey an output $V_{OUT}$, which may be conveyed to a negative input of summer 602. With respect to FIGS. 6 and 11, unit 608 may represent pulse-width modulator 410 and filter 404 (i.e., filter 404 is collapsed into pulse-width modulator 410), unit 610 may represent filter 406, and unit 612 may represent switching converter 104. Further, it is noted that "$\tau_{lp}$" is a frequency of a low-pass portion of filter 406 and "$\tau_{hp}$" is a frequency of a high-pass portion of filter 406. The transfer function of model 600 may have a very high DC gain, but returns to $A_{MOD}$) above $\tau_{cor}$. If $\tau_{hp}$ is set above $\tau_{cor}$, then the negative-feedback loop likewise does not interact with the positive-feedback loop and $\tau_{lp}$ provides lead compensation beginning at $1/\tau_{lp}$.

Figure 12:
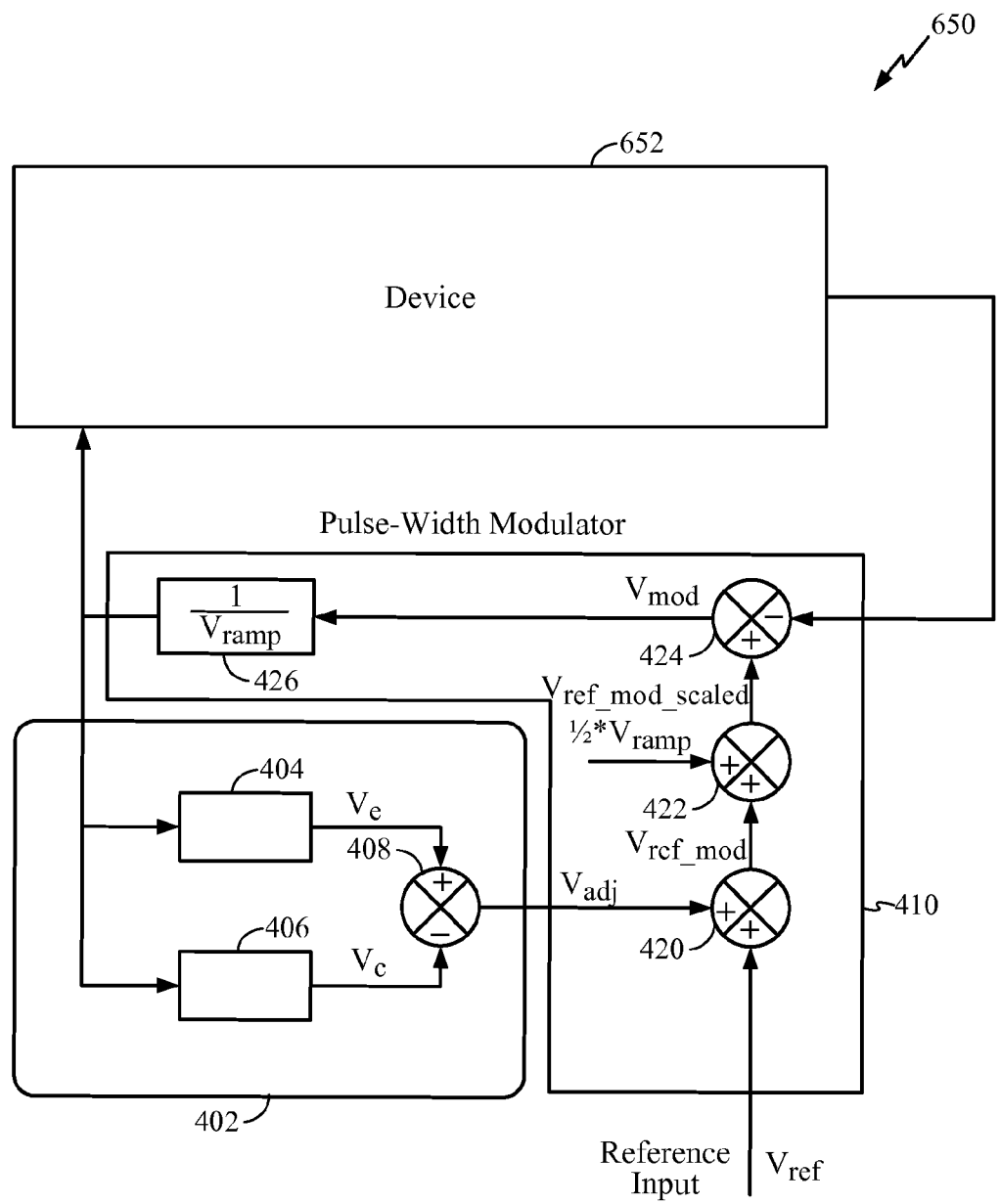
FIG. 12 illustrates a system including a feedback path directly coupling an output voltage of a device to a pulse-width modulator, and a filter unit coupled between an output and an input of the pulse-width modulator, in accordance with an exemplary embodiment of the present invention.

It is noted that although the exemplary embodiments disclosed above are described in relation to a power converter, the present invention is not so limited. Rather, the exemplary embodiments, including a filter unit configured to generate an error correction signal, a compensation voltage, or both (i.e., based on PWM (i.e., duty cycle) information), may be implemented with other devices, such as a motor. FIG. 12 illustrates a system 650 including a device 652 having an output coupled to a first input of pulse-width modulator 410. An output of pulse-width modulator 410 is coupled to an input of device 652 and an input of filter unit 402. As described above, filter unit 402 is configured to receive PWM information (i.e., the output of pulse-width modulator 410) and convey a signal, which is based on error correction voltage $V_e$, and/or compensation $V_c$, to a second input of pulse-width modulator 410 for modifying reference voltage $V_{ref}$. By way of non-limiting examples, device 652 may comprise a power converter, a motor, or any other suitable device. More specifically, system 650 may be implemented within any system using pulse-width modulation (e.g., audio amplification, AC and DC motor control, load regulation in LED lighting, and communications). As will be appreciated by a person having ordinary skill in the art, system 650 is configured to generate a transfer function to stabilize and/or error correct a closed loop without elements that inhibit the performance of the closed loop.

Figure 13:
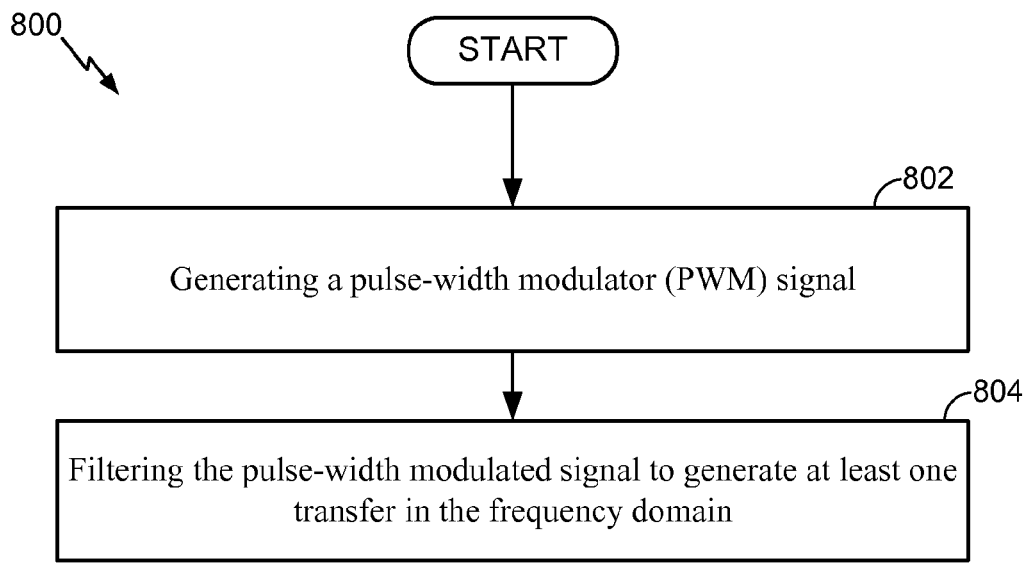
FIG. 13 is a flowchart illustrating a method, according to an exemplary embodiment of the present invention.

FIG. 13 is a flowchart illustrating a method 800, in accordance with one or more exemplary embodiments. Method 800 may include generating a pulse-width modulated signal (depicted by numeral 802). Method 800 may also include filtering the pulse-width modulated signal to generate at least one transfer in the frequency domain (depicted by numeral 804).

Figure 14:
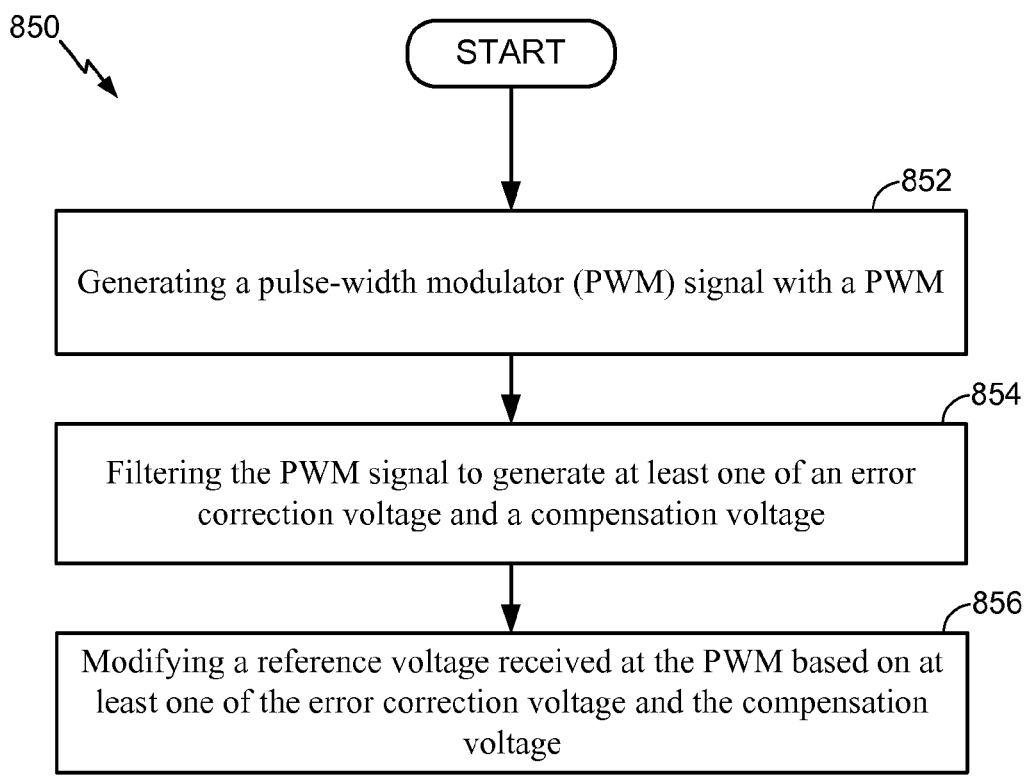
FIG. 14 is a flowchart illustrating another method, according to an exemplary embodiment of the present invention.

FIG. 14 is a flowchart illustrating a method 850, in accordance with one or more exemplary embodiments. Method 850 may include generating a pulse-width modulator (PWM) signal with a PWM (depicted by numeral 852). Method 850 may also include filtering the PWM signal to generate at least one of an error correction voltage and a compensation voltage (depicted by numeral 854). Further, method 850 may include modifying a reference voltage received at the PWM based on at least one of the error correction voltage and the compensation voltage (depicted by numeral 856).

Figure 15:
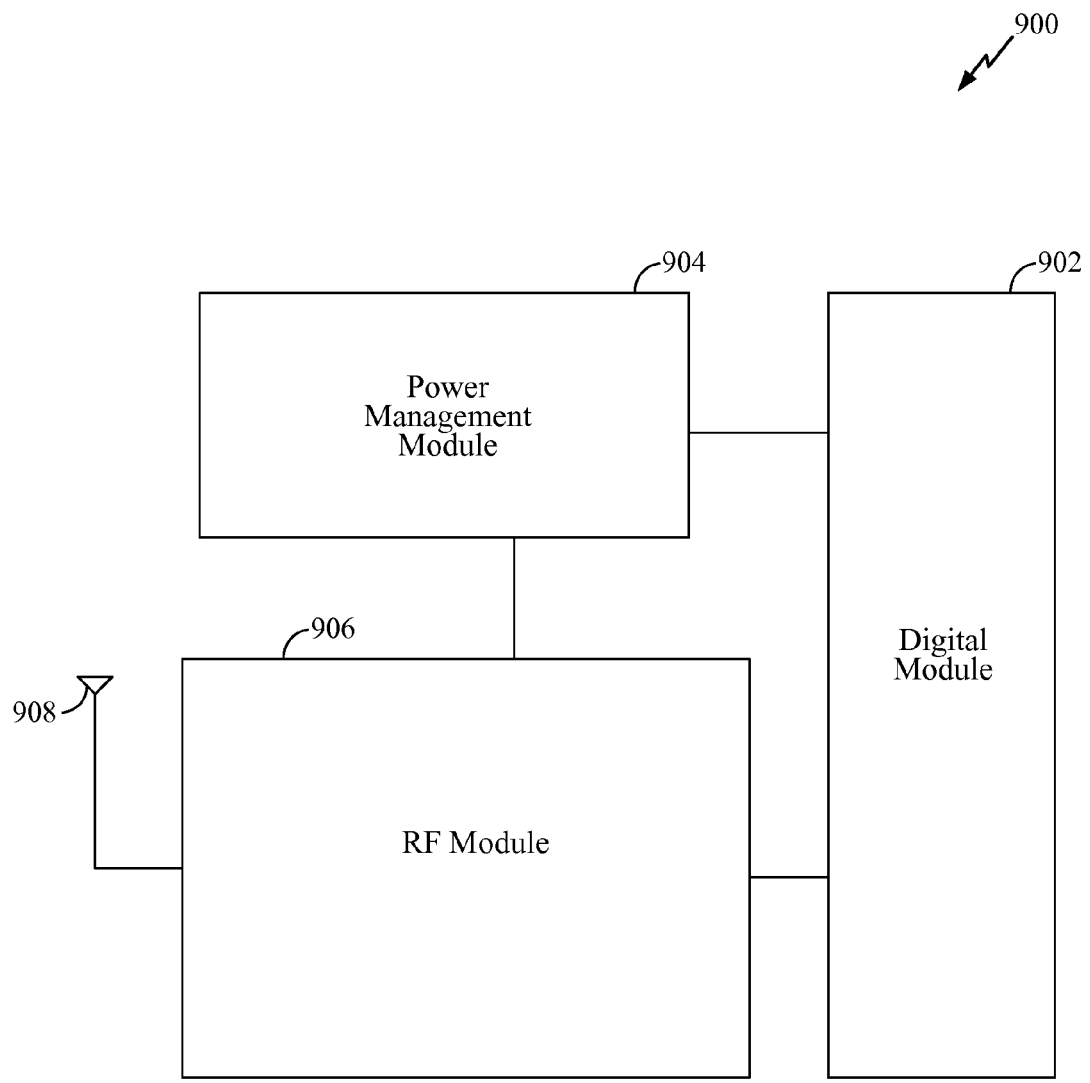
FIG. 15 illustrates a system including a switching power converter, in accordance with an exemplary embodiment of the present invention.

FIG. 15 is a block diagram of a wireless communication device 900. In this exemplary design, wireless communication device 900 includes digital module 904, an RF module 906, and power management module 904. Digital module 204 may comprise memory and one or more processors. RF module 906, which may comprise a radio-frequency integrated circuit (RFIC) may include a transceiver including a transmitter and a receiver and may be configured for bi-directional wireless communication via an antenna 908. In general, wireless communication device 900 may include any number of transmitters and any number of receivers for any number of communication systems, any number of frequency bands, and any number of antennas. Further, power management module 904 may include one or more power converters, such as power converters 200 and 400 illustrated in FIGS. 2 and 4-6. It is noted that the power converters described herein (i.e., power converter 200 and 400) may be configured for providing voltage regulation of fast dynamic current loads, such as loads found in large digital circuits (e.g., microprocessors and graphics cores).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A device, comprising:
   a pulse-width modulator configured to receive a first input voltage and convey a modulated output voltage;
   a filtering unit including at least one filter configured to receive the modulated output voltage, generate at least one of an error correction signal and a compensation signal, and convey a second input voltage to the pulse-width modulator based on at least one of the error correction signal and the compensation signal, wherein the at least one filter comprises:
      a first filter coupled to an output of the pulse-width modulator and configured to convey the error correction signal to a first input of a first comparator; and
      a second filter coupled to the output of the pulse-width modulator and configured to convey the compensation signal to a second input of the first comparator, and wherein an output of the first comparator comprises the second input voltage, and
   a switching unit configured to receive the modulated output voltage and convey the first input voltage directly to the pulse-width modulator,
   wherein the first comparator is configured to compare the error correction signal and the compensation signal and convey an adjustment voltage, and
   wherein the pulse-width modulator comprises:
      a first summer configured to receive a reference voltage and the second input voltage and convey a modified reference voltage;
      a second summer configured to receive a scaled ramp voltage and the modified reference voltage and to convey a scaled, modified reference voltage;
      a second comparator configured to receive the first input voltage and the scaled, modified reference voltage and to convey a modulated voltage; and
      a divider configured to receive the modulated voltage and to convey the modulated output voltage.

2. The device of claim 1, the first filter comprising a low-pass filter and the second filter comprising a bandpass filter.

3. The device of claim 1, wherein the switching unit further comprises one of a motor and a power converter configured to convey the first input voltage to the pulse-width modulator and receive the modulated output voltage.

4. The device of claim 3, the one of a motor and a power converter directly coupled to the pulse-width modulator.

5. The device of claim 3, the first input voltage comprising a power converter output voltage, the pulse-width modulator configured to adjust a triangle waveform in response to a change in the power converter output voltage.

6. A method, comprising:
generating a pulse-width modulated signal with a pulse-width modulator;
filtering, with a filtering unit, the pulse-width modulated signal to generate at least one of an error correction voltage and a compensation voltage;
modifying a reference voltage received at the pulse-width modulator based on at least one of the error correction voltage and the compensation voltage, wherein the filtering comprises:
   filtering the pulse-width modulated signal using a first filter to convey the error correction voltage to a first input of a first comparator; and
   filtering the pulse width-modulated signal using a second filter to convey the compensation voltage to a second input of the first comparator, wherein an output voltage of the first comparator modifies the reference voltage, and
switching the pulse width-modulated signal using a switching unit,
wherein the switching unit is configured to receive the pulse width-modulated signal and convey an output voltage directly to the pulse-width modulator,
wherein the first comparator is configured to compare the error correction signal and the compensation signal and convey an adjustment voltage, and
wherein the pulse-width modulator comprises:
   a first summer configured to receive the reference voltage and the adjustment voltage and convey a modified reference voltage;
   a second summer configured to receive a scaled ramp voltage and the modified reference voltage and to convey a scaled, modified reference voltage;
   a second comparator configured to receive the output voltage of the switching unit and the scaled, modified reference voltage and to convey a modulated voltage; and
   a divider configured to receive the modulated voltage and to convey the pulse-width modulated signal.

7. The method of claim 6, wherein the first filter comprises a low pass filter and the second filter comprises a bandpass filter.

8. The method of claim 6, wherein modifying the reference voltage comprises adjusting a triangle wave centered on the reference voltage.

9. The method of claim 8, wherein filtering the pulse-width modulated signal comprises generating one or more transfer functions in a frequency domain.

10. A device, comprising:
means for generating a pulse-width modulated signal with a pulse-width modulator;
means for filtering the pulse-width modulated signal to generate at least one of an error correction voltage and a compensation voltage;
means for modifying a reference voltage received at the pulse-width modulator based on at least one of the error correction voltage and the compensation voltage, wherein the means for filtering comprises:
a first filter coupled to an output of the pulse-width modulator and configured to convey the error correction voltage to a first input of a first comparator; and
a second filter coupled to the output of the pulse-width modulator and configured to convey the compensation signal to a second input of the first comparator, wherein an output of the first comparator modifies the reference voltage; and
switching means for switching a pulse width-modulated signal and conveying an output voltage of the switched signal directly to the pulse-width modulator,
   wherein the first comparator is configured to compare the error correction signal and the compensation signal and convey an adjustment voltage, and
wherein the pulse-width modulator comprises:
   a first summer configured to receive the adjustment voltage and the reference voltage and convey a modified reference voltage;
   a second summer configured to receive a scaled ramp voltage and the modified reference voltage and to convey a scaled, modified reference voltage;
   a second comparator configured to receive the output voltage of the switched signal and the scaled, modified reference voltage and to convey a modulated voltage; and
   a divider configured to receive the modulated voltage and to convey the pulse-width modulated signal.

* * * * *